E. R. JESTER.
PLASTIC MOLD.
APPLICATION FILED NOV. 1, 1919.

1,337,074.

Patented Apr. 13, 1920.

Inventor
E. R. Jester,

By Geo. P. Kimmel
Attorney

UNITED STATES PATENT OFFICE.

ERNEST R. JESTER, OF WALTON, NEW YORK.

PLASTIC MOLD.

1,337,074.  Specification of Letters Patent.  Patented Apr. 13, 1920.

Application filed November 1, 1919. Serial No. 335,062.

*To all whom it may concern:*

Be it known that I, ERNEST R. JESTER, a citizen of the United States, residing at Walton, in the county of Delaware and State of New York, have invented certain new and useful Improvements in Plastic Molds, of which the following is a specification.

This invention relates to improvements in plastic molds forming the subject matter of my prior application filed November 7, 1917, Serial Number 200,744, and it is the principal object of the invention to provide a knock down form embodying features of compactness and convenience of assembly for molding plastic watering troughs and similar products.

Another object is to provide a novel means for the mold core whereby the latter will be properly centered and rigidly maintained in position in the mold and, when necessary, may be easily and quickly removed therefrom as during the disassembly of the mold to facilitate removal of the finished product.

A further object is the provision of a mold wherein the supporting means for the core is so constructed and arranged as to afford free access to the space between the mold and core for the purpose of filling the plastic material and for smoothing and finishing the top surface of the molded article.

Another object is the provision of a mold with novel types of braces whereby the separable parts of the molds are rigidly maintained in assembled relation and reinforced.

With these and other objects in view as will appear as the description proceeds, the invention comprises the novel features of construction, combination of elements and arrangement of parts which will be more fully described in the following specification and set forth with particularity in the claims appended hereto.

Figure 1:
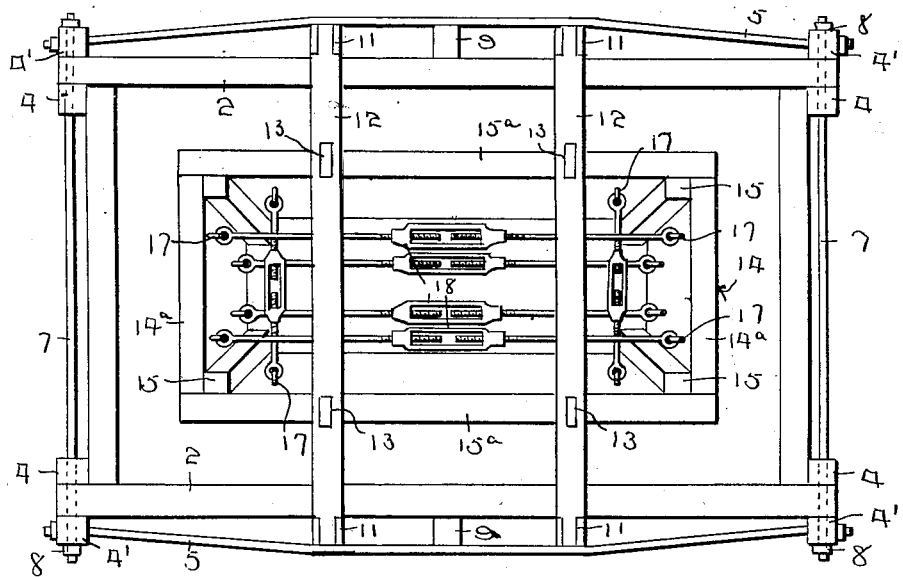
Figure 1 represents a plan view of the improved molds.

Referring to the drawing in detail, wherein similar reference numerals designate corresponding parts throughout the several views, the numerals 2 indicate the opposed side walls of the outer form or mold which are provided at their terminals with vertical strips 4′ receiving the terminals of rods 5 the extremities of which are threaded for the reception of nuts whereby the proper degree of pressure may be brought to bear against the strips 4′. The end walls of the forms are interposed between the terminals of the side walls and are provided with vertically disposed terminal strips 4 having apertures therein which register with transverse apertures formed in the terminals of the side walls 2 and the strips 4′ carried thereby for the reception of clamping bolts 7 having threaded extremities receiving nuts 8 whereby the side walls may be brought into clamping relation to the terminals of the end walls 3 to rigidly maintain the several parts of the mold in assembled relation.

Intermediate vertically disposed braces 9 are attached to the medial external portion of the side walls 2 and maintain the brace rods 5 in outwardly bowed or arched form so as to more effectively resist tendency of the side walls to bend. A pair of uprights 10 are secured to the side walls of the intermediate braces 9 and are also engaged by the arched rods 5 whereby the uprights are rigidly maintained in engagement with the faces of the side walls 2. The upper extremities of the uprights 10 are bifurcated as indicated at 11 and receive the reduced extremities of horizontally disposed supporting beams 12, the shoulders defined by reducing the terminals of the beams 12 being engaged with the bifurcations of the uprights 10 to rigidly maintain the beams 12 in position and prevent end thrust thereof.

The core designated generally by the numeral 14 comprises a separable four-wall structure including the end walls 14ª and side walls 15ª the latter being provided with spacing strips 15 constituting abutments for the end walls 14ª whereby the several walls are maintained in properly spaced and assembled relation. The inner portions of the side and end walls are provided with terminals pivotally connected with rods 17 having the adjacent extremities threaded and arranged in pairs for coöperation with turn buckles 18 by which the walls 4 are clamped together and rigidly maintained in assembled relation. The opposed side walls of the core 14 are provided with vertically extending supporting bars having reduced upper extremities fitted in apertures 13 formed intermediate the terminals of the horizontal supporting beams 12 and secured therein by bolts or equivalent securing means 13ª.

Figure 2:
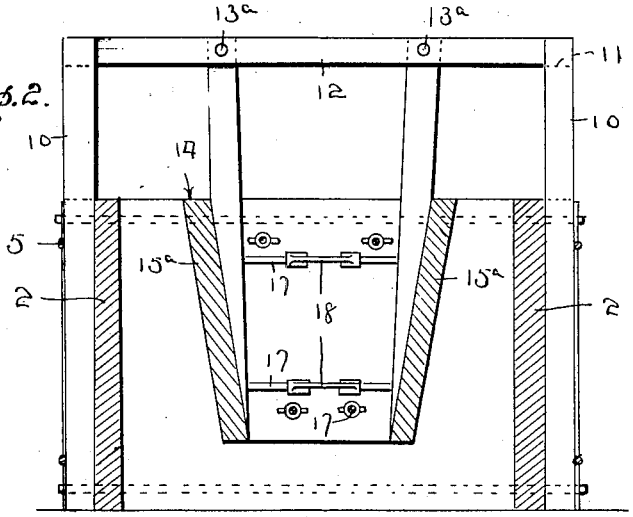
Fig. 2 represents a transverse sectional view therethrough in the plane of one of the supporting devices of the mold core.

As suggested in Fig. 2 the uprights 10 are extended a distance above the top edges of the mold and core a sufficient distance to maintain the horizontal beam in sufficiently spaced relation to the mold as to afford free access to the entire space between the mold and core permitting material to be poured into the mold and also the surfacing of the molded article therein. It is further evident that the inexpensive and simple expedient of fitting the terminals of the horizontal beams in the bifurcated extremities of the uprights, the core is accurately centered and maintained in proper position with relation to the mold. In removing the core, as when the plastic material is properly set, the horizontal beams may be readily removed vertically from the bifurcated extremities of the uprights and the entire core structure removed bodily from the molded article.

What I claim is:

1. A mold comprising a sectional outer form, means for clamping the sections together, bracing members carried by the longitudinal sections of the form, uprights engaged with the longitudinal form sections and confined beneath the braces, and a core removably suspended from the upper terminals of the uprights.

2. A device of the character described comprising an outer mold composed of side and end walls, means for clamping said walls together, bracing rods carried by the side walls, uprights engaged with the side walls and confined beneath the brace rods whereby the latter are maintained in an arched form, and a core removably suspended from said uprights.

3. A device of the character described comprising an outer mold including side and end walls, means for clamping the walls together, reinforcing strips carried by the terminals of the side walls, brace rods engaged in said reinforcing strips, uprights engaged with the medial portions of the side walls and confined beneath the bracing rods whereby the latter are maintained in arched form, said uprights having bifurcated extremities, supporting beams removably engaged in the bifurcated extemities of the uprights, and a core suspended from said beams.

In testimony whereof I affix my signature hereto.

ERNEST R. JESTER.